United States Patent
Ball et al.

(10) Patent No.: US 6,600,736 B1
(45) Date of Patent: Jul. 29, 2003

(54) METHOD OF PROVIDING TRANSFER CAPABILITY ON WEB-BASED INTERACTIVE VOICE RESPONSE SERVICES

(75) Inventors: Thomas J. Ball, Naperville, IL (US); Peter John Danielsen, Naperville, IL (US); Peter Andrew Mataga, Naperville, IL (US); Kenneth G. Rehor, Berwyn, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/282,895

(22) Filed: Mar. 31, 1999

(51) Int. Cl.$^7$ .......................... H04L 12/66; H04M 11/00
(52) U.S. Cl. ..................................... 370/352; 379/88.14
(58) Field of Search ................................. 370/401, 352, 370/230, 353, 354, 356; 379/88.14, 88.17

(56) References Cited

U.S. PATENT DOCUMENTS

| | | | |
|---|---|---|---|
| 5,799,063 A | 8/1998 | Krane ........................... | 379/67 |
| 5,884,262 A | 3/1999 | Wise et al. .................. | 704/270 |
| 5,953,392 A | 9/1999 | Rhie et al. ............... | 379/88.13 |
| 6,067,357 A * | 5/2000 | Kishinsky et al. ..... | 379/265.02 |
| 6,418,199 B1 * | 7/2002 | Perrone .................... | 379/88.01 |

FOREIGN PATENT DOCUMENTS

WO    WO 97/32427    9/1997    ............ H04M/2/00

OTHER PUBLICATIONS

D. L. Atkins et al., "Integrated Web and Telephone Service Creation," Bell Labs Technical Journal, vol. 2, No. 1, 19–35 (Dec. 21, 1997).

Ser. No. 09/168,405, filed Oct. 6, 1998 by M.K. Brown, K.G. Rehor (co–inventor herein), B.C. Schmidt and C.D. Tuckey entitled "Web–Based Platform for Interactive Voice Response (IVR)".

(List continued on next page.)

*Primary Examiner*—Chau Nguyen
*Assistant Examiner*—Scott Waite
(74) *Attorney, Agent, or Firm*—Stephen M. Gurey

(57) ABSTRACT

Interactive voice response (IVR) services are provided to an end user at a telephone terminal (201) connected to the PSTN (202) through a telephone/IP server (205) that serves as an interface between the PSTN and an IP network (204) such as the Internet. A first IVR service is provided by a web server (203) running a service logic (207) for that service, which produces pages formatted in a phone markup language (PML) in response to an HTTP request sent over the IP network by the telephone/IP server to the web server at the URL address associated with the service. Hyperlinks to a second IVR service offered on a web server (208) at a different URL address are embedded and associated with a specific question or statement in a PML-formatted page produced by the first service. When the end user affirmatively responds to that statement or question through a verbal or touch-tone input, the telephone/IP server translates that response as a "click" on the hyperlink and establishes a virtual connection to the hyperlinked URL address of the web server providing the second service. Further, information associated with the end user's interaction with the first service, such as his identity, PIN, and/or zip code, is transferred to the second service by means of a cookie, URL encoding or other information transference mechanism, to provide an audio experience that seamlessly transfers the end user from the first service to the second.

14 Claims, 3 Drawing Sheets

OTHER PUBLICATIONS

International Publication No. WO 97/40611, published Oct. 30, 1997, by Benedikt, M.A., Ladd, D.A., Ramming, J.C., K.G., Tuckey, C.D., titled, "Method and Apparatus For Information Retrieval Using Audio Interface", Class: H04L 29/06, H04M 3/50.

D.L. Atkins, T. Ball, T. R. Baran, M.A. Benedikt, K.C. Cox, D. A. Ladd, P.A. Mataga, C. Puchol, J.C. Ramming, K.G. Rehor, and C. Tuckey, "Intetrated Web and Telephone Service Creation", *Bell Labs Technical Journal*, Winter, 1997, pp. 19–35.

J. C. Ramming, "PML: A Language Interface to Networked Response Units", Workshop on Internet Programming Languages, ICCL '98 Loyola University, Chicago, Illinois, May, 1998.

http://home, netscape, com/newsref/std/cookie_spec.html, Support Documentation, Netscape, "Persistent Client State HTTP Cookies".

Q.Hardy, "AT&T, Motorola And Lucent in Pact On Internet Access", *The Wall Street Journal*, Tuesday, Mar. 2, 1999.

* cited by examiner

METHOD OF PROVIDING TRANSFER CAPABILITY ON WEB-BASED INTERACTIVE VOICE RESPONSE SERVICES

TECHNICAL FIELD

This invention relates to interactive voice services, and more particularly to interactive voice services provided over a combination of a voice network and a computer network such as the Internet.

BACKGROUND OF THE INVENTION

In traditional interactive voice response (IVR) systems, an end user at an audio terminal, such as a telephone set, interacts over the public switched telephone network (PSTN) with an IVR system, such as a CONVERSANT® system available from Lucent Technologies, Inc. During the progress of a call, the end user provides audio or touch-tone inputs in response to queries or prompts outputted by the IVR system over the PSTN, as for example when a user identifies himself by name and/or the input of an ID or PIN code through touch-tone or voice. The IVR system, using a combination speech recognition techniques and standard techniques for detecting dual tone multi-frequency (DTMF) touch-tone inputs, is able to interpret the end user's responses. The queries and the expected audio or touch-tone inputs from the end user follow a "script" programmed into the IVR system in accordance with the service being provided by the proprietor of the system. The general population is familiar interacting with such systems, which are used, as example, for banking transactions, telephone catalog sales, etc. With such systems, when the end user completes an interactive session through one IVR system and wishes to engage in a next interactive session with a different IVR system that may or may not be associated with the first system, he terminates the first call and then initiates a second telephone call from his telephone set over the PSTN to the second IVR system. When the second call is answered, the end user may need to again identify himself in some manner, and then proceed with the session with the second IVR system. Thus, the end user initiates each successive IVR session over the PSTN through separate independent telephone calls, at each of which he is likely to need to identify himself to the IVR system by means of an ID code and/or PIN number, through speech recognition or other mechanism. If during an interactive session with a first IVR system, transfer to a second separate, but associated, IVR system is required, such as from a customer service department to a sales department, the service provider must effect the transfer of the call with the concomitant expense of the second call.

In the last several years, the use of the Internet as a means of transporting information to and from users has grown in leaps and bounds. Typically, computers equipped with browser programs, such as the popular Netscape® Navigator or Microsoft® Explorer browsers, provide a graphical user interface which allows the computer user to interact with web servers connected on the Internet or other Internet Protocol (IP) computer network. With such browser programs, the computer user, by inputting a web server's Uniform Resource Locator (URL) code, establishes a virtual connection over the Internet to that web server. Via hypertext markup language (HTML)-formatted pages that are transmitted to the user and displayed on the computer's monitor, a user is able to interact with a provider of goods, services or information. By clicking on a hyperlink or by inputting a new URL code, the user's computer is quickly connected to retrieve another page from the same or a different web server.

Techniques for extending Internet access to the still large number of end users who do not have a computer and are equipped only with a telephone or other similar audio interface device have been developed and described in, for example, International Application Published Under the Patent Cooperation Treaty (PCT), Publication Number WO 97/40611 entitled "Method and Apparatus For Information Retrieval Using Audio Interface", published Oct. 20, 1997 and claiming a priority date of Apr. 22, 1996 based on a co-pending U.S. patent application Ser. No. 08/635,801 to M. A. Benedikt, D. A. Ladd, J. C. Ramming, K. G. Rehor (co-inventor herein), and C. D. Tuckey; D. L. Atkins, T. Ball (co-inventor herein), T. R. Baran, M. A. Benedikt, K. C. Cox, D. A. Ladd, P. A. Mataga (co-inventor herein), C. Puchol, J. C. Ramming, K. G. Rehor (co-inventor herein), and C. D. Tuckey, "Integrated Web and Telephone Service Creation", Bell Labs Technical Journal, pp. 19035, Winter 1997; and U.S. patent application Ser. No. 09/168,405, filed Oct. 6, 1998 to M. K. Brown, K. G. Rehor (co-inventor herein), B. C. Schmidt and C. D. Tuckey entitled "Web-Based Platform for Interactive Voice Response (IVR)". A phone markup language (PML) that can be used for web-based voice interactive services is described by J. C. Ramming in "PML: A Language Interface to Networked Voice Response Units", Workshop on Internet Programming Languages, ICCL '98, Loyola University, Chicago, Ill., May, 1998. All four of these references are incorporated by reference herein. On Mar. 2, 1999, the *Wall Street Journal* reported joint cooperation by AT&T, Motorola and Lucent Technologies on a voice extensible markup language that allows end users to access the Internet by voice. That language is expected to become a standard for defining voice commands to the Internet and is likely to incorporate many aspects of the aforenoted PML.

As described in the aforenoted references, an end user at an audio terminal, such as a telephone, can access interactive services on an IP network through a system that acts as an adjunct that interfaces the PSTN voice network and the IP network such as the Internet or other wide area or local area computer network. In particular, this system, referred to hereinafter as a telephone/IP adjunct or server, functions to enable end users to engage in interactive services via their telephone set with web servers connected on such a wide area or local area network. The telephone/IP server, as described in the references, is embodied as hardware and software on a general purpose computer that together perform the functions of audio play and record, text-to-speech synthesis, DTMF (touch-tone) recognition, automatic speech recognition (ASR), and other call control functions necessary for interactive audio services. The telephone/IP server functions to accept inputs from the telephone end user as speech or DTMF signals, and act as a proxy browser for that end user in making requests over the Internet to the web servers that provide the IVR services with which the end user wishes to interact. Whereas the language format between a browser on an end user's client terminal and a web server is conventionally the hypertext markup language (HTML), the telephone/IP server and the web servers providing the IVR services communicate using a modification of HTML, the phone markup language (PML) described in the aforenoted article by J. C. Ramming. As noted, PML will be supplanted in the future with the expected-to-be standardized voice extensible markup language.

The telephone/IP server includes the necessary interpreter middleware that interacts with the services on the web server to interpret dialogs to be carried out with the end user. Such dialog interpretation involves coordination of the lower-level audio processing necessary to interact with the end user, and communication of the results of a dialog with the end user to the IVR service on the web server that specified it.

A dialog includes information to be presented to the end user, and may specify information to be collected from the end user. It is, in effect, an audio "form" that is filled out by the end user, using DTMF tones or audio input, and returned to an interactive voice service. A dialog may involve multiple prompts and multiple collections of user inputs. Moreover, the dialog may specify control flow information, if the sequencing of interactions is dependent on what the end user inputs. For example, only a subset of information might be audibly presented to the end user if the user makes choices from a hierarchical menu. Alternatively, it may be necessary to re-prompt the end user when he does not respond or makes an illegal choice or input.

The interpreter within the telephone/IP server thus performs a user interface role only, assisting the end user on the telephone set in navigating through information that is presented audibly, and in "filling out a form". It, in effect, functions as an audio browser for the service retrieved from the web server providing the IVR service. The interpreter has no access to data other than what is specified in the dialog, and little or no computation is performed on information collected from the end user. Rather, a service logic that runs on the web server processes the data and generates the dialogs.

At each web server that provides an interactive voice service, a service logic is executed that performs the functions of making decisions, data access and storage, computation, and transaction processing that needs to be performed to offer the interactive voice service to the end user. The service logic, however, interacts with the end user only by generating dialogs for the interpreter in the telephone/IP server. The infrastructure used for CGI services on the web is used for communication between the interpreter in the telephone/IP server and the service logic resident on the web server. Thus, HTTP requests and CGI form submissions are used for the retrieval of dialogs and the notification of results.

Dialogs are specified as "pages" of PML, or its equivalent. The PML, or its equivalent, allows a service creator to specify output from audio files and text (via text-to-speech), input fields for digits and spoken information, choices from lists using DTMF and speech recognition grammars, and control flow for the dialog. As HTML pages are, pages of PML, or its equivalent, are textual (they may, however, contain references to non-textual data, such as audio files and compiled grammars, which must be retrieved/cached for dialog processing), and can be static or created dynamically (by CGI execution).

FIG. 1 shows the telephone/IP service architecture that enables an end user of telephone set 101 connected to the PSTN 102 to engage in an interactive voice response session with a service provider who provides a service via a web server 103 connected to IP network 104, such as the Internet, rather than an IVR system connected directly to the PSTN. As an example, if the service provider is a brokerage house whose service provides personalized stock quotes based on an individual's portfolio, the end user at telephone 101 calls that brokerage house's 800 number associated with that service. That call is routed as a circuit switched voice call over PSTN 102 to the telephone/IP server 105, which is connected to the PSTN network 102, but may be geographically located anywhere. Telephone/IP server 105 is also connected to IP network 104. Upon answering the incoming telephone call, telephone/IP server 105, running interpreter 106, uses the called number to access a URL from its database (not shown) that identifies the first dialog in the service associated with that called number. This URL is used in a TCP/IP HTTP request transmitted over IP network 104 to the particular web server 103 running the service logic 107 corresponding to the stock quoting service. Web server 103 responds to the request with a PML page. This PML page is transported over IP network 104 back to telephone/IP server 105, and is interpreted by interpreter 106, causing a welcoming message to be played and prompting the end user for input of an identifier such as a user name and PIN. That information, received from the end user at telephone set 101 over the PSTN by the server 105 is returned to the web server 103 as an HTTP request that is a CGI form submission. Verification of the PIN takes place on web server 103, and, if verified, the response is another PML page that contains a list of stock quotes that are customized for that end user. That customized PML page is sent back over IP network 104 to telephone/IP server 105 which converts the received PML page to audio format for transmission over the PSTN 102 to the end user at telephone set 101. While listening to the list, the end user may be able to barge in to request a particular stock quote for another stock.

With the telephone/IP server-mediated interactive voice service, the end user may not and need not know that the service is being provided through a web server 103 connected to the Internet 104 rather than through a traditional IVR system connected to the PSTN. Thus, the dialogs presented to the end user through the telephone/IP server appear to the end user to have no different audible characteristics than the dialogs presented during a session with a traditional IVR system connected to the PSTN.

The telephone/IP server 105 is not specialized for the particular service provided by web server 105 but rather is a generic resource capable of interpreting dialog markup in the form of PML pages on behalf of any interactive voice service embodied on a web server. Disadvantageously, in accordance with the prior art telephone/IP architecture, in order to successively access a second separately defined interactive voice service (which may just be a separately configured service associated with the provider of the first service) either the end user must place a second telephone call for that second service, or the service provider must bear the expense of placing a separate voice call to the second IVR system. Thus, for example, continuing the illustrative stock quote service above, if the end user wants to place an order to buy or sell a stock, which service is not embodied on the dialogs created by the service logics 107 running on web server 105 but rather is embodied on a separate web server, he must hang up and place a new call to a different 800 number to initiate a separate interactive voice session with that brokerage house's IVR stock transaction service. Furthermore, the end user must again go through an identification procedure by identifying himself through name and PIN, or some alternative manner.

SUMMARY OF THE INVENTION

In accordance with the present invention, a transfer capability is provided to enable an end user who is connected via his telephone set to a first web-based IVR service to transfer to a second separately configured web-based IVR service without placing an additional telephone call, and wherein information associated with the end user's transaction with the first service is transferred to the second service. Specifically, while interacting in an IVR session in a first service through a telephone/IP server, the end user may be audibly presented with the ability to transfer to a specific second service. That second service may be totally distinct from the first service, or may be related to the first service, such as a different department of that first service provider, but which second service is configured with a service logic on a web server separate from the service logic providing the first service. That transfer option is communicated to the end user during a dialog in the first web-based IVR service, which dialog is defined on a PML-formatted page having a hyperlink to the URL address associated with the second service. In response to an end user's input, which may be communicated by means of a verbal answer or a touch-tone input in response to a question posed during the dialog, the interpreter running on the telephone/IP server recognizes the user's input and, by means of an TCP/IP HTTP request, establishes a connection to the web server running the second IVR service at the URL indicated by the hyperlink. Further, and significantly, in establishing the connection to the web server providing the second IVR service, an information transference takes place that provides information to that second IVR service that is relevant to the end user's interactive session with the first IVR service. That information transference can take place by means of a cookie, URL encoding, or another information transference mechanism. The information transferred can include the identity of the end user, his PIN, and other information associated with the user and/or the just completed session with the web server during the first IVR service or other past IVR sessions. In this manner, the end user, via a single telephone call that is terminated at the telephone/IP server, is able to effect a seamless transfer to a succession of IVR services which may be running on separate web servers without even realizing that such services are being provided from different sources. Further, each of these separately running services, which may be on different web servers running their own service logics, need not be coordinated with respect to their operating systems, server hardware, tool sets, etc., since the telephone/IP interpreter, interacting with each such service with standardized PML pages, provides seamless interoperability. Therefore, a service provider, providing a plurality of different services, can independently add to or modify the interactive services it provides without concern for the interoperability between each such service.

DETAILED DESCRIPTION

Figure 1:
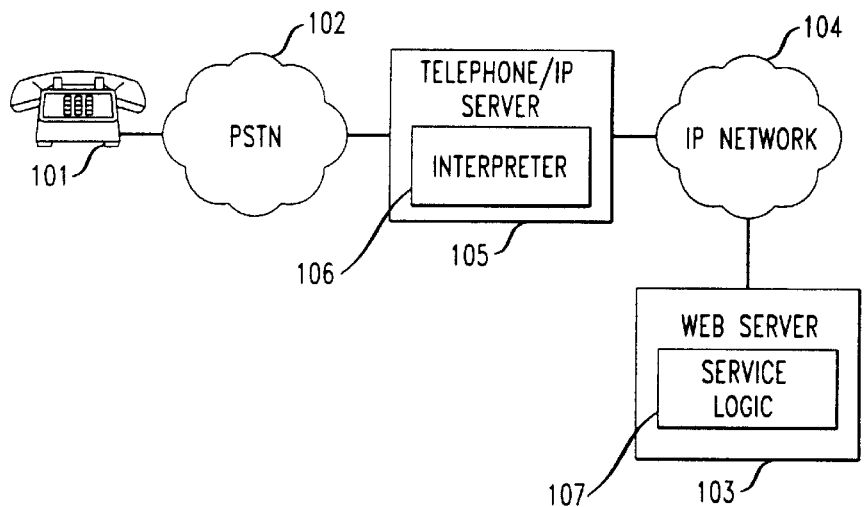
FIG. 1 is a block diagram showing the prior art telephone/IP service architecture.
Figure 2:
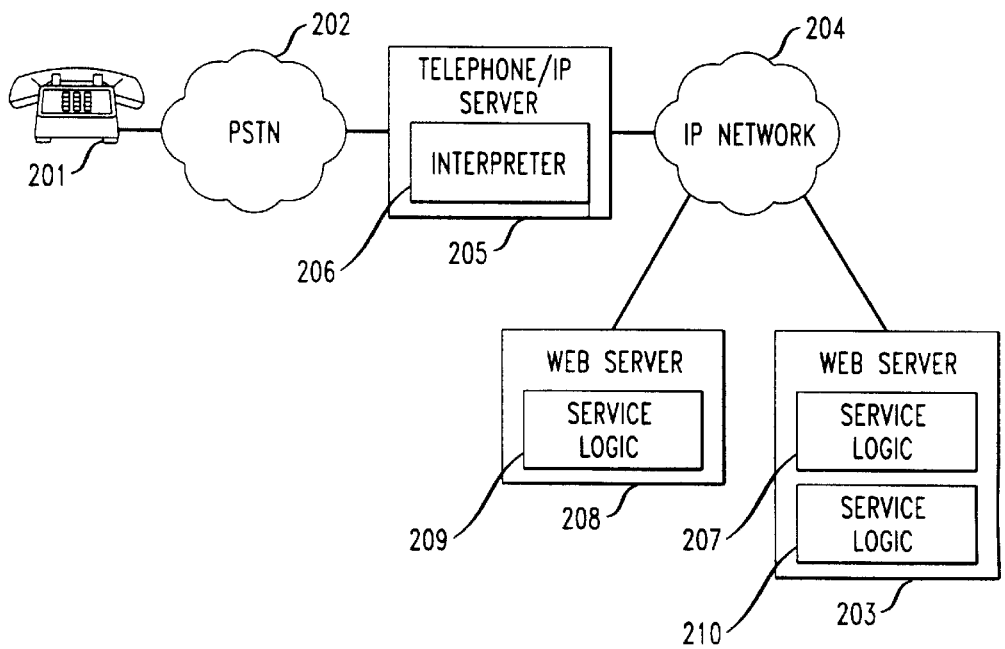
FIG. 2 is a block diagram showing the service architecture of the present invention.

With reference to FIG. 2, an end user of telephone set 201 connected to the PSTN 202 places a circuit switched telephone cal, such as an 800-number call, over the PSTN to a telephone number that terminates at telephone/IP server 205. The end user by placing that call intends to engage in an interactive session for a predefined service. The end user need not know and is not likely to know that the IVR service he is accessing via his telephone is being serviced through a telephone/IP server to a web server connected on an IP network. Rather, as far as the audio experience presented to the end user is concerned, there will be no noticeable difference as compared to the experience the end user would encounter if interacting with a conventional PSTN-based IVR system such as provided by a Conversant® system. The user is thus not likely to be aware that the interactive session is being provided in part over an IP network with a web server programmed to respond to HTTP requests with PML-formatted pages, which are returned to the telephone/IP server for translation and "playing" to the end-user, and through which such user responses are collected, translated, and sent back to the web server.

As previously described, telephone/IP server 205, which can be geographically located anywhere that is reachable over the PSTN 202, provides an interface between PSTN 202 and IP network 204. Telephone/IP server 205, running interpreter 206, upon receiving the telephone call originated by the end user, terminates the telephone call by answering it, and retrieves the URL of the IVR web service requested by the end user from a database (not separately shown). That data lookup is performed based on the number dialed by the end user, which number represents the particular IVR service requested by the end user through the placement of the telephone call to that number.

Using the determined URL, interpreter 206, running on telephone/IP server 205, makes an HTTP request over IP network 204 to the web server 203 associated with that URL. For the example previously described, an HTTP request for the first PML page of a web server 203 providing a brokerage house's stock quoting service is made by the end user by dialing the 800 number associated with the brokerage house's stock quoting service. For purposes of illustration, the URL for that service could be http://www.stockquote.foo.com/main.pml . Web server 203, running service logic 207, responds to telephone/IP server 205 via an HTTP TCP/IP transfer with a first PML page from that URL address. That page is an interactive page requiring audio and/or touch-tone responses by the end user to one or more questions audibly presented to the end user. For the user-specific stock quoting service the question(s) may relate to the end user's identity and PIN. For a non-user specific service, a question requiring an end user's response may be, for example, a request for the user's zip code if the requested service provides, as an example, a weather forecast for a geographic area based on the inputted zip code.

For any such IVR service, whatever information is inputted by the end user in the dialog via voice or touch-tone is converted by the interpreter 206 in telephone/IP server 205 to an HTTP format and forwarded over IP network 204 to the web server 203 providing the service. The service logic 207 running on web server 203, upon receipt of the HTTP-formatted end user-inputted information responds to the telephone/IP server 205 with a PML-formatted page that may include further interactive statements requesting additional input from the end user.

For the weather service, for example, the response may include both the weather forecast for the inputted zip code area and a question querying the end user whether he is desirous of a forecast for another zip code location. As noted above, for the stock quoting service, the first page presented to the end user queries the end user for his name and PIN since the service is associated with the particular end user's account. For this stock quoting service, if the end user inputs a valid name and PIN, the web server is likely to first respond with a dialog on a PML-formatted page that recognizes the end user by name, and provides the current stock quotes for the specific stocks in the end user's portfolio. After that interactive dialog, the dialog may include a query questioning the end user whether any other current stock quotes are desired. If the end user answers affirmatively, the dialog will continue, requesting the user to input, in some manner, the identity the other stock or stocks for which a current a stock quote is desired. These dialogs may be configured on separate PML-formatted pages that are part of the service provided through the service logic 207 running on web server 203.

During the end user's interactive session in a first service, web server 203 may produce a PML-formatted page that will result in the end user being transferred to a different separately configured second service. This second interactive service may be embodied on a web server 208 this is physically separate from web server 203, running its own service logic 209, as shown in FIG. 2. Alternatively, the second interactive service may run on the same web server 203 with the first interactive service, running its own service logic 210, or it may also be running on the same web server running the same service logic 207, but at a separate URL. Transference to the second service is effected through a PML-formatted page that is presented to the user through telephone/IP server 205. Specifically, during a dialog in the first service, the user may be presented with a question or statement requiring an audio or touch-tone input from the end user. Associated with that question/statement on the PML-formatted page is a hyperlink to a URL address associated with the web server providing the second service. This hyperlink is embedded in the PML-formatted page in the same manner as a hyperlink is embedded in a conventional HTML-formatted page that is generated by a web server for display on a graphical user interface such as a computer terminal. Since the PML-formatted page can not be visually displayed to the end user on the telephone, but rather is presented within the dialog of an audio script, the end user, in order to "click" on the hyperlink that will effect a transfer to the URL associated with the hyperlink, must do so audibly via a touch-tone input or verbal input. The end user can do this in response to the question/statement presented in the dialog on the PML page, or at some other audio means that is interpreted by the interpreter 206 of telephone/IP server 205 as being representative of a "click" on the hyperlink. By audibly "clicking" on the hyperlink, telephone/IP server 205 establishes a virtual connection to the URL address of the hyperlinked second service embodied on, for example, web server 208. The first PML-formatted page of the service represented by that URL address on web server 208 is then presented through telephone/IP server 205 to the end user, enabling the end user to continue his interaction with the second service unaware that he is now being serviced through a different web server.

For the weather forecast example described above, during a dialog within that service the end user may be presented with a special offer, the dialogs for such a special offer being generated and controlled by web server 208, different than the web server 203 providing the weather service. Further, that offer may be associated with the end user's zip code. The end user, by affirmatively responding via voice or touch-tone to an inquiry whether he is interested in learning about the offer presented during a dialog from a PML-formatted page outputted by web server 203, effects a transfer of telephone/IP server 205 to the hyperlinked URL on web server 208 that is presenting that special offer. Upon establishing the connection to that URL, the end user is interactively presented with this service's PML dialogs as formulated on the service logic 209 running on web server 208. Through a single telephone call, the end user is thus able to interact with this second interactive service running on a separate web server as if on the same "telephone call" with the first service. In the same manner, in response to an audio hyperlink in PML-formatted pages produced in the dialogs generated during the second service, the end user is able to "click" from that second service to a hyperlinked third service, or can "click" back to the first service if, for example, the interpreter 206 on telephone/IP server 205 is programmed to recognize an audio input such as "back up" or other phrase.

For the brokerage house scenario previously described, as in the weather forecast server example, during an IVR dialog with the stock quotation service, the end user may be queried whether he is interested in purchasing or selling stock through the brokerage house's transaction department. As an example, a dialog presented to the end user may be: "If you would like our stock transaction department please enter or say '5'. If you would like another stock quote, please say its two-letter ticker identification. If you would like to end this session please say '7', or hang-up. Thank you." For purposes of this example is it assumed that the transaction service is implemented on a web server 208 that is separate from the web server 205 on which the stock quotation service is run. Thus, a hyperlink to the URL of the transaction service is associated with that dialog and is executed by interpreter 206 of telephone/IP server 205 in response to the input by the end user of either a touch-tone "5" or verbal "five". In response to either input, the interpreter in telephone/IP server 205 establishes a virtual connection to the hyperlinked URL address of the transaction service running on web server 208.

In accordance with the present invention, an information transference is effected when the end transfers from a first service to a second service in response his verbal or DTMF input during a dialog in the first service. This information transference is effected whether the second service is provided on the same or a different web server that is providing the first service. In particular, content of that information transference is associated with the end user's interaction in the first service, which information is then made available to the second service to effect a seamless transition to that second service in manner that is likely to be undetectable by the end user. Specifically, for the weather forecast example postulated above in which the end user is requested to input his zip code to determine the area for which the forecast is desired, and is then offered a special offer, the user-inputted zip code is transferred to the second service to enable that second service to present an offer that is particularly associated with the geographic area associated with the end user's zip code. This is thus an example where the end user's individual identity is not critical to either the first or second service but where his location is necessary to the first service, the weather forecast, and for the second service wherein the special offer is also dependent the user's location. Thus, by transferring the zip code information from the first service to the second service, the end user does not have to re-enter his zip code and commence his interaction with that service as if he were initiating his telephone call from the beginning. To the end user, therefore, there is an integration between the first service and the second service, the latter of which may be being provided from a web server by a service provider which is totally independent of the service provider of first service.

In the example above in which the end user segues from of the stock quoting service to the separately configured transaction department, the information transferred needs to include the end user's name and PIN to enable the web server 208 running the transaction service to access the end user's account. Further, the information transferred may include information associated with the particular stock quotes that were accessed by the end user while "visiting" the stock quoting service on web server 203 and/or other information associated with the end user's visit at that site, such as answers to specific questions that may have been posed to the end user during his interaction with the stock quoting service. Such additional information may be relevant to the service logic 209 running the transaction-oriented service on web server 208 in order to better formulate an interactive PML-formatted page that is customized for presentation to the end user.

Through the information transference mechanism, the end user's experience in transferring from his brokerage house's stock quoting service to the transaction-oriented service is seamlessly effected on a single telephone call. Advantageously, as the end user is transferred from service to service, he need not re-input previously inputted information. Further, with respect to the service providers, each service that is running separate service logics can be individually configured. The various services thus need not be coordinated with each other with respect to their operating systems, server hardware, tool sets, etc., since telephone/IP server 205 interacts with each such service with standardized PML pages, thereby providing seamless interoperability. A service provider, providing a plurality of different service can thus independently add to or modify the interactive services its provides without concern for interoperability between each service.

Various information mechanisms can be employed to transfer relevant information from a first IVR service to a second. In a first mechanism, a cookie is used to transfer information from the web server providing the first service to the telephone/IP server 205. Specifically, a cookie is included in the header of one or more of the PML-formatted pages sent by the web server running the first service to the telephone/IP server 205. The received cookie is then stored by interpreter 206 and associated with the presently connected end user. Cookies are well known in the IP art and are described on a Netscape homepage at URL: http://home.netscape.com/newsref/std/cookie_spec.html. The cookie sent to telephone/IP server 205 and stored by interpreter 206 includes the originating domain name of the web server, an expiration date, and data items associated with the transaction running on the web server with that end user. Those data items may include information such the end user's name and PIN number, as well as possibly, in the stock quoting service example, other information associated with that end user's portfolio of stocks. For the weather forecast example, the cookie may include the zip code that was inputted by the end user. When the end user responds affirmatively in a dialog to a question that will effect a transfer to a different service running on a different URL, the HTTP request made to that URL will include the information in that cookie if a cookie is stored in telephone/IP server for that end user. Conventionally, a cookie is only sent in the request if the domain name of the URL to which the HTTP request is directed is the same as the originating domain name of the cookie. Thus, for the stock brokerage example, if the URL of the transaction department is http://www.transaction.foo.com/main.pml, a cookie created by the stock quoting service at URL http://www.stockquote.foo.com/main.pml will be passed to the sales department since both services share the common domain name foo.com. On the other hand, for the weather forecast example, the URL of the service providing the special offer may not share the same domain name. In that case, the interpreter 206 running on telephone/IP server 205 needs to be programmed to send a cookie originating from one domain name to one of a predetermined and defined list of other domain names when an HTTP request is made to a URL whose domain name is on that list. Cookies may include data items in addition to the identity and PIN of the end user, such as information associated with the end user's interaction in the first service. Thus, as an end user's interaction with the first service progresses, a cookie is continually updated and included in the header of the data sent to the telephone/IP server 205 to replace a previously stored cookie.

Whereas cookies can be transferred to only another service sharing the same domain name, or with special programming, to a service whose domain name is on a list that is stored and accessed by the telephone/IP server 205, other well known information transference mechanisms can also be used. One such other well known mechanism is URL encoding, which is portable across domains. In accordance with URL encoding, the service logic running the first service on the web server appends data items to the URLs used in the hyperlinks hidden in each PML-formatted page. Such data items can include the login name and PIN of the end user, for the stock quotation example, or the zip code of the end user for the weather forecast example. Thus, for the stock quote example, the hyperlink created on the PML-formatted page that links the end user to the transaction department may be http://www.transaction.foo.com?login=Ken&PIN=1234 where the "?" separates the URL of the web server providing the service and the data items being passed to that URL, and where an "&" separates each data item. Thus, in this example end user's identity, Ken, and his PIN, 1234, are passed to the transaction service. Additional data items may, for example, include information related to the particular stocks for which the end user requested quotes while interacting in the stock quoting service. Thus, the URL in the hyperlink to the transaction service will be continually modified to include more data elements as the end user interacts within the first service.

The use of URL encoding is most useful when the second service is unrelated to the first service. Thus, for the weather forecast service, which is linked to special offers provided by a service provider that is likely not have any association with the service provider of the weather forecast service, URL encoding enables a data item comprising the user's zip code to be included in the hyperlink that links the weather service to the special offer service.

Figure 3A:
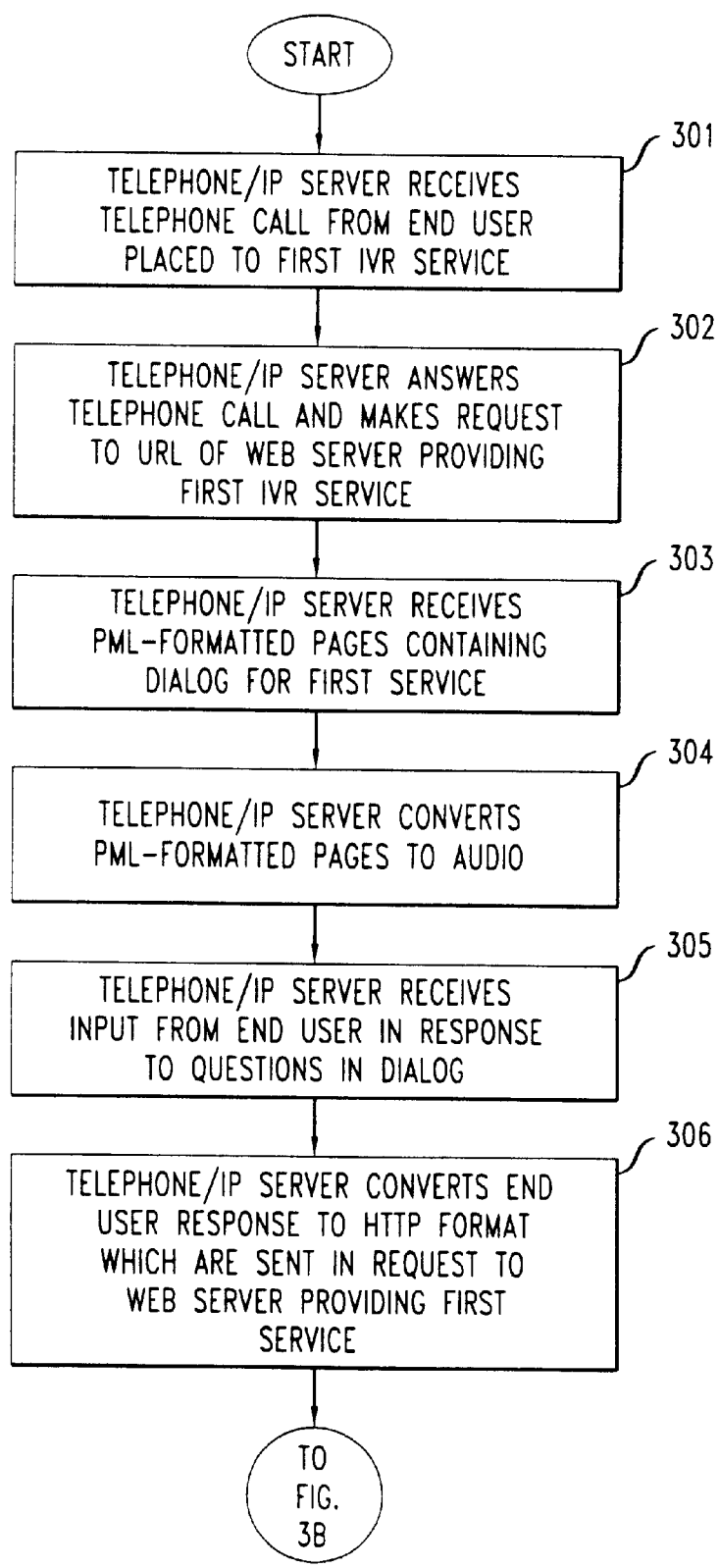
FIGS. 3A and 3B together are a flow chart detailing the steps of the present invention.
Figure 3B:
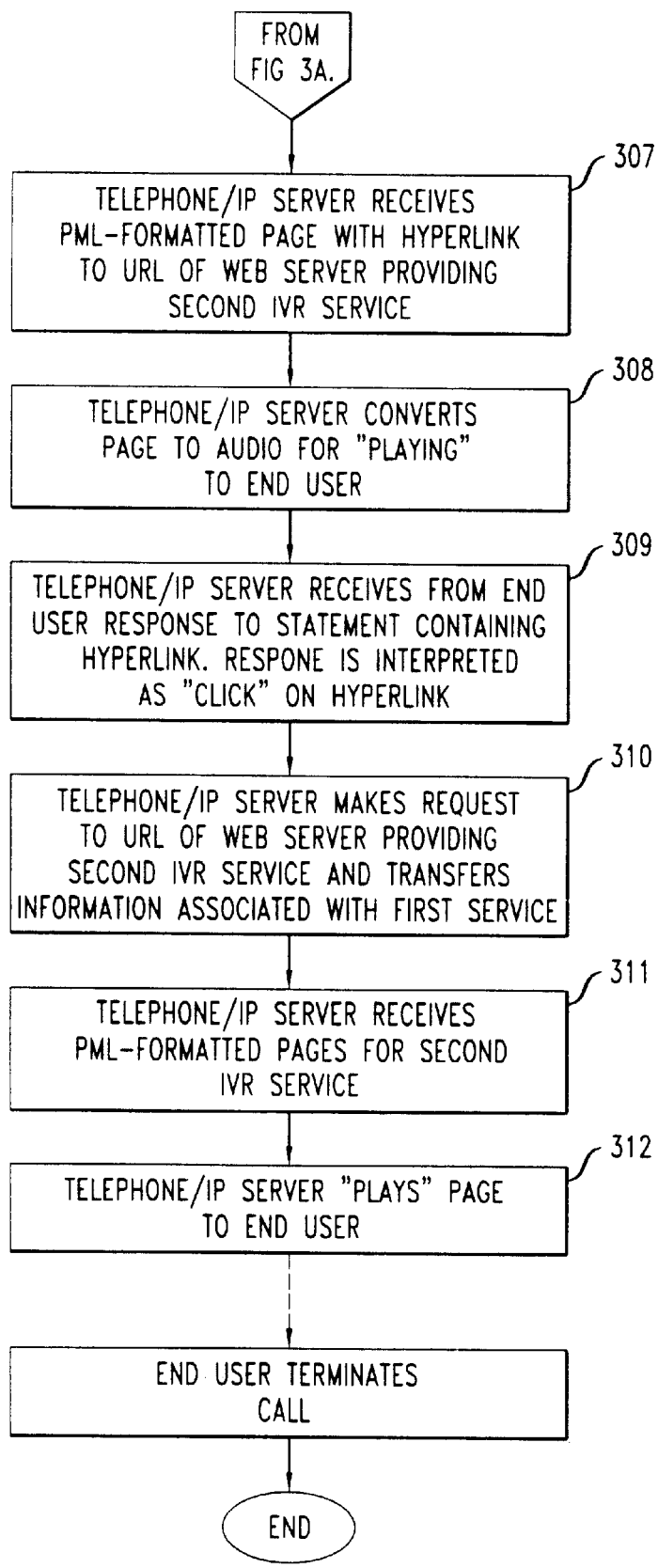

FIGS. 3A and 3B together are a flowchart that summarizes the steps of the present invention. At step 301, a telephone/IP server receives a telephone call from an end user placed to a telephone number associated with a first IVR service with which the end user wishes to interact. At step 302, the telephone/IP server answers the telephone call and makes a request to the URL of a web server of a service provider providing that first IVR service, as determined by the dialed telephone number. At step 303, the telephone/IP server receives from the web server one or more PML-formatted pages containing an interactive dialog for that first service. At step 304, the telephone/IP server converts the PML-formatted page(s) to an audio format that is "played" to the end user. At step 305, the telephone/IP server receives verbal or touch-tone responses from end user in response to each interactive statement "played" to end user in the interactive dialog that requires a response from the end user. At step 306, the telephone/IP server converts each response of the end user to an HTTP format which is then sent to the web server providing the first service.

At step 307, the telephone/IP server receives from the web server a PML-formatted page containing an interactive statement having an associated hyperlink to a URL of a web server providing a second IVR service. At step 308, the telephone/IP server "plays" the page containing the hyperlink to the end user. At step 309, the telephone/IP server receives from the end user a response to the interactive statement containing the hyperlink that is interpreted by the telephone/IP server as a "click" on that hyperlink. At step 310, the telephone/IP server makes a request to the URL of the hyperlink to the web server providing the second IVR service, and transfers to that second IVR service information associated with the end user's interaction with the first IVR service. As previously described, that information transference can be achieved by means of a cookie sent by the telephone/IP server to the second service in the header of HTTP connection to the web server providing the second service, by means of URL encoding of the hyperlink on the PML page produced by the web server providing the first service, or by means of any other information transference mechanism.

At step 311, the telephone/IP server receives from the web server providing the second IVR service one or more PML-formatted pages containing interactive dialog for the second IVR service. At step 312, the telephone/IP server "plays" the page(s) to the end user. The interaction between the end user, the telephone/IP server and the web server providing the second IVR service continues until the end user terminates the call or responds to a statement in a PML page that is associated with a hyperlink that transfers the user either back to the URL of the web server providing the first IVR service or to the URL of a web server providing a third IVR service.

In the above description, the use of the term "PML" is merely representative of any phone markup language or its equivalent, standardized or not, that can be used and understood by the telephone/IP server to receive and transmit interactive dialogs over a packet-based computer network from and to a web server providing an interactive voice service.

The following merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, and the like represent various processes which may be substantially represented in computer readable medium and so executed by a computer or processor, whether or not such computer or processor is explicitly shown.

The functions of the various elements shown in the FIGS., including functional blocks labeled as "servers" may be provided through the use of dedicated hardware as well as hardware capable of executing software in association with appropriate software. When provided by a server or computer, the functions may be provided by a single dedicated processor, by a single shared processor, or by a plurality of individual processors, some of which may be shared. Moreover, explicit use of the term "server" or "computer" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide these functionalities as being equivalent to those shown herein.

The invention claimed is:

1. A method for use in a system that comprises a telephone/IP server which serves as a gateway between an end user at an audio terminal that is communicating over a telephone network and a plurality of web servers on an IP network, which telephone/IP server translates web pages that are formatted using a phone markup language and received from the web servers into dialogs containing statements and/or questions for transmission over the telephone network to the end user, and which translates the end user's inputs and/or responses to such statements and/or questions received from the audio terminal over the telephone network into IP-formatted requests for transmission over the IP network, the method comprising the steps of:

translating into an audio signal a web page that is formatted using the phone markup language and is received from a web server running a first service logic through which a first interactive voice response (IVR) service is provided, the translated web page providing a dialog containing statements and/or questions associated with said first IVR service for transmission over the telephone network to the end user's audio terminal; and translating the received end user's responsive audio inputs to the statements and/or questions in the dialog of the first IVR service into IP-formatted requests for transmission on the IP network;

characterized in that:
at least one of the statements and/or questions associated with said first IVR service on its web page that is formatted using the phone markup language is associated with a hyperlink that is capable of being accepted by the end user through an audio input at the audio terminal, the hyperlink being a link to a web page that is formatted using the phone markup language that is on a web server running a second service logic through which a second IVR service is provided, and that the method further comprises the steps of:
translating an audio input received over the telephone network from the end user's audio terminal in response to the end user's affirmative response to the statement and/or question associated with the hyperlink into to an IP-formatted request for the linked web page on the web server providing the second IVR service;
outputting onto the IP network the IP-formatted request for the web page associated with the hyperlink for transmission to the web server running the second IVR service logic, the request also transferring information associated with the end user's interactions within the first IVR service to the second service logic providing the second IVR service;
translating a received responsive linked web page formatted using the phone markup language from the web server running the second IVR service logic into an audio signal, the responsive web page from the web server running the second IVR service logic being formed using at least some of the transferred information associated with the end user's interactions with the first IVR service, the translated linked web page providing a dialog containing statements and/or questions associated with said second IVR service,
wherein from the end user's standpoint, with the transfer to the second service logic of information associated with the end user's interactions within the first IVR service, a seamless transition occurs between the provisioning of the first IVR service by the first service logic and the provisioning of the second IVR service by the second service logic.

2. The method of claim 1 wherein the hyperlink is a URL address.

3. The method of claim 2 wherein the URL address of the hyperlink contains the information associated with the end user's dialog in the first IVR service.

4. The method of claim 2 wherein the first IVR service and the second IVR service are configured separately at different URL addresses.

5. The method of claim 4 wherein the first service logic through which the first IVR service is provided and the second service logic through which the second IVR service is provided are running on the same web server.

6. The method of claim 4 wherein first service logic through which the first IVR service is provided and the second service logic through which the second IVR service are running on different web servers.

7. The method of claim 1 wherein the information associated with the end user's interactions within the first IVR service comprises a name of the end user inputted by the end user.

8. The method of claim 7 wherein the information associated with the end user's interactions within the first IVR service further comprises a password inputted by the end user.

9. The method of claim 1 wherein the information associated with the end user's interactions within the first IVR service comprises a zip code inputted by the end user.

10. The method of claim 1 wherein end user's affirmative response to the statement and/or question associated with the hyperlink is verbally inputted through the audio terminal.

11. The method of claim 1 wherein the end user's affirmative response to the statement and/or question associated with the hyperlink is a dual tone multi-frequency tone inputted through the audio terminal.

12. The method of claim 1 wherein the information associated with the end user's interactions within the first IVR service is included in a cookie forwarded in the request made to the web server providing the second IVR service.

13. The method of claim 1 wherein the IP network is the Internet.

14. The method of claim 1 wherein the phone markup language is the voice extensible markup language.

* * * * *